May 30, 1933.  A. L. WEHRHAHN ET AL  1,912,232
STACKING MACHINE
Filed Feb. 16, 1931    6 Sheets-Sheet 6
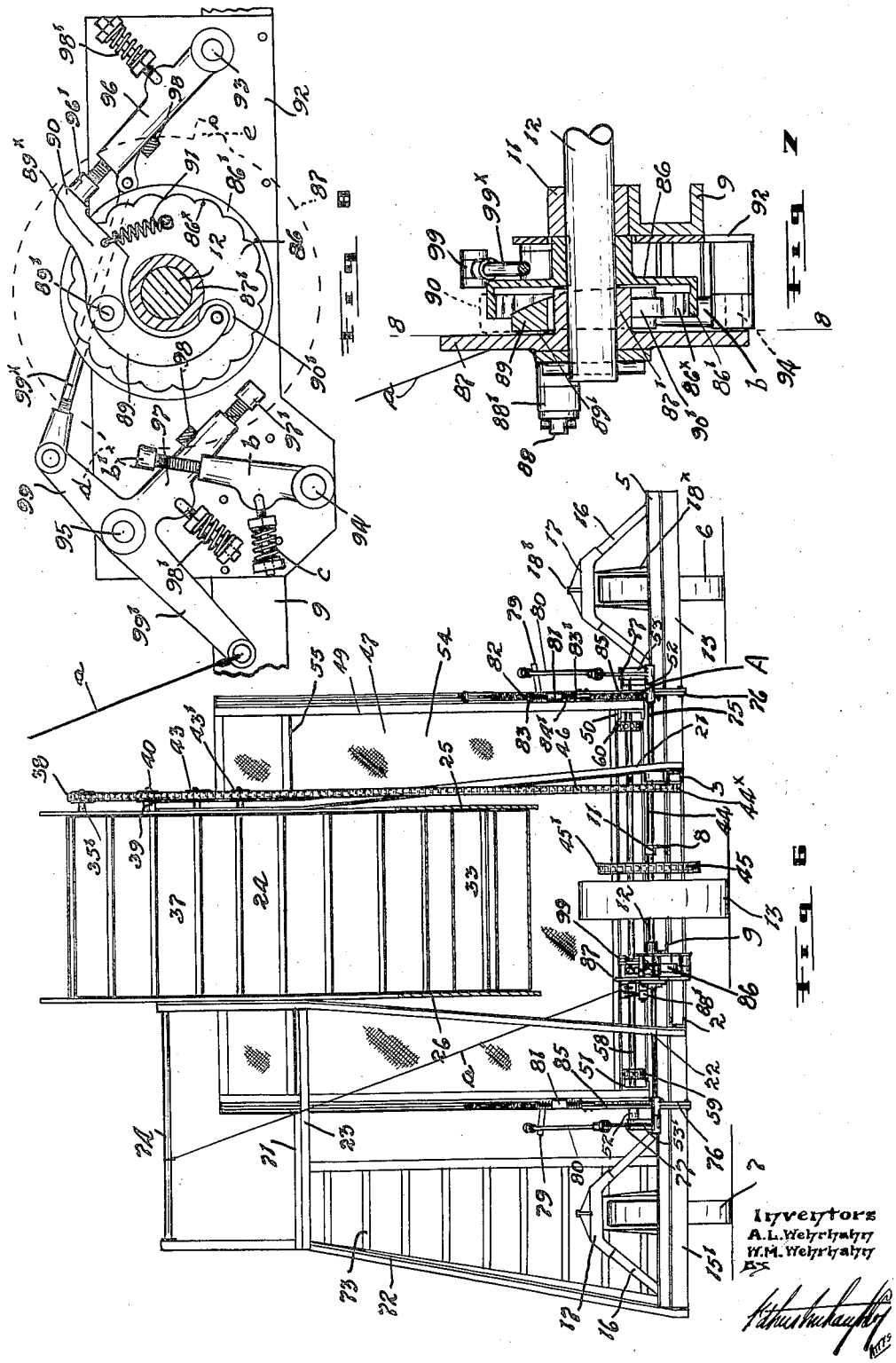
Inventors
A.L. Wehrhahn
W.M. Wehrhahn
By Patented May 30, 1933

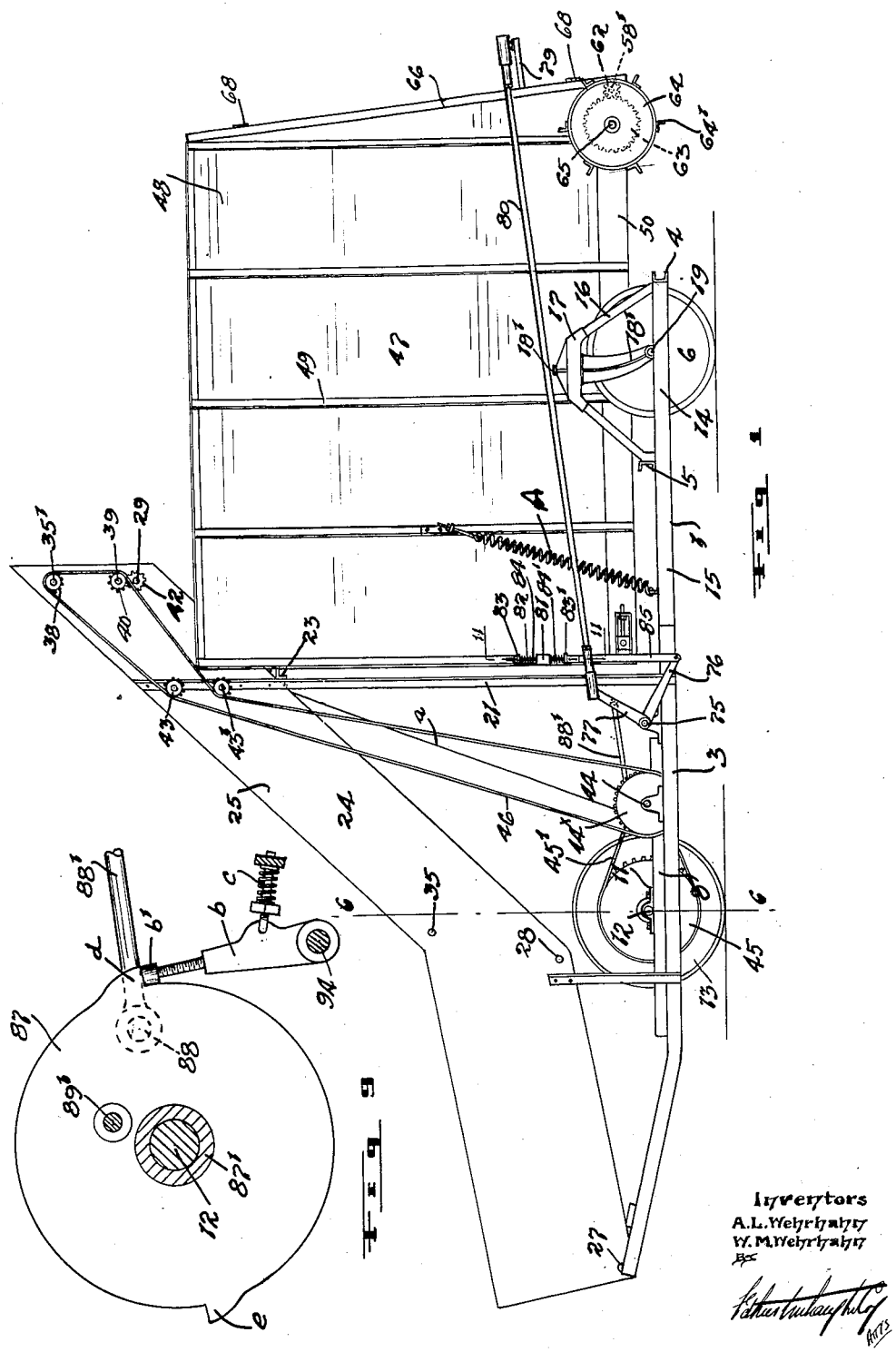

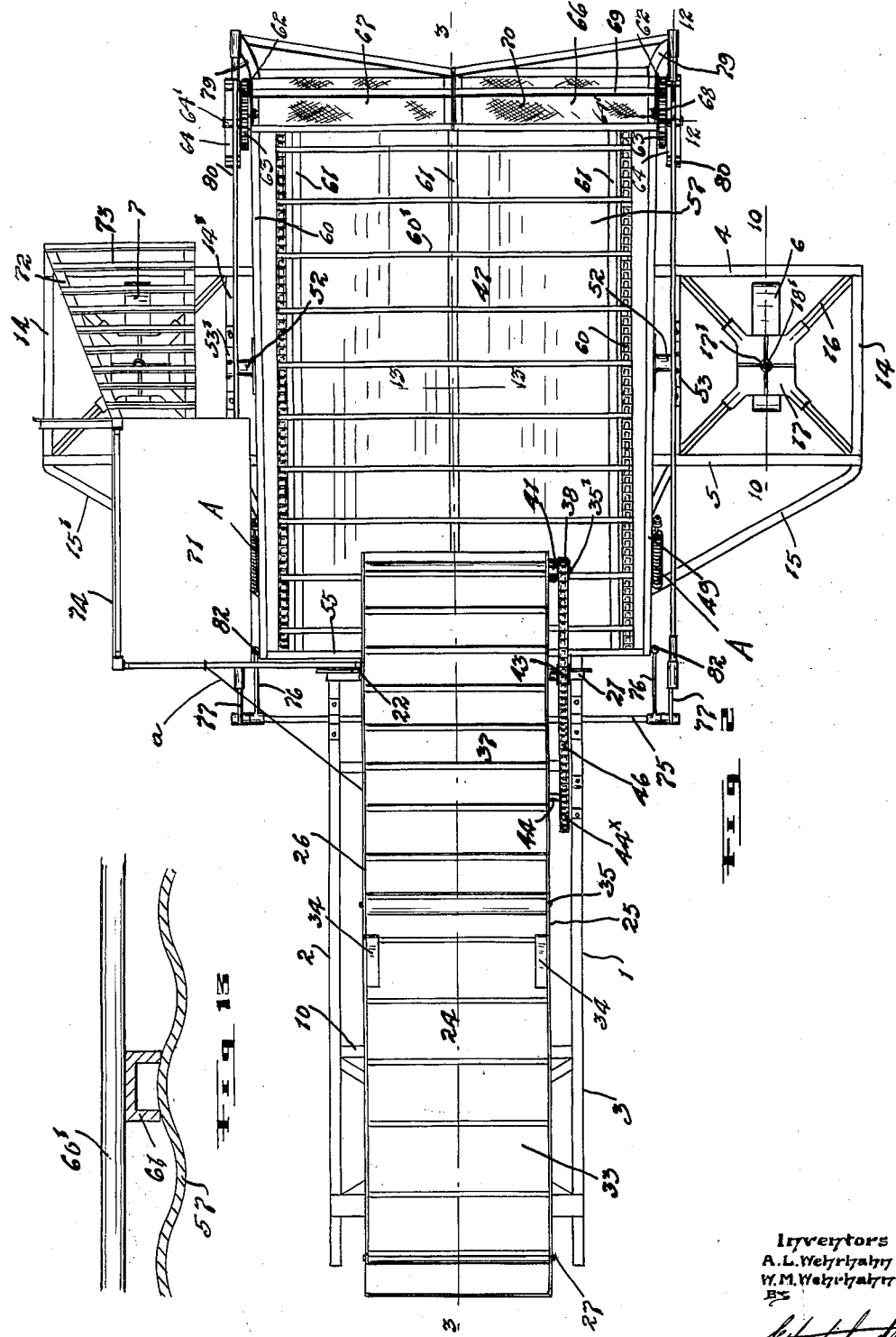

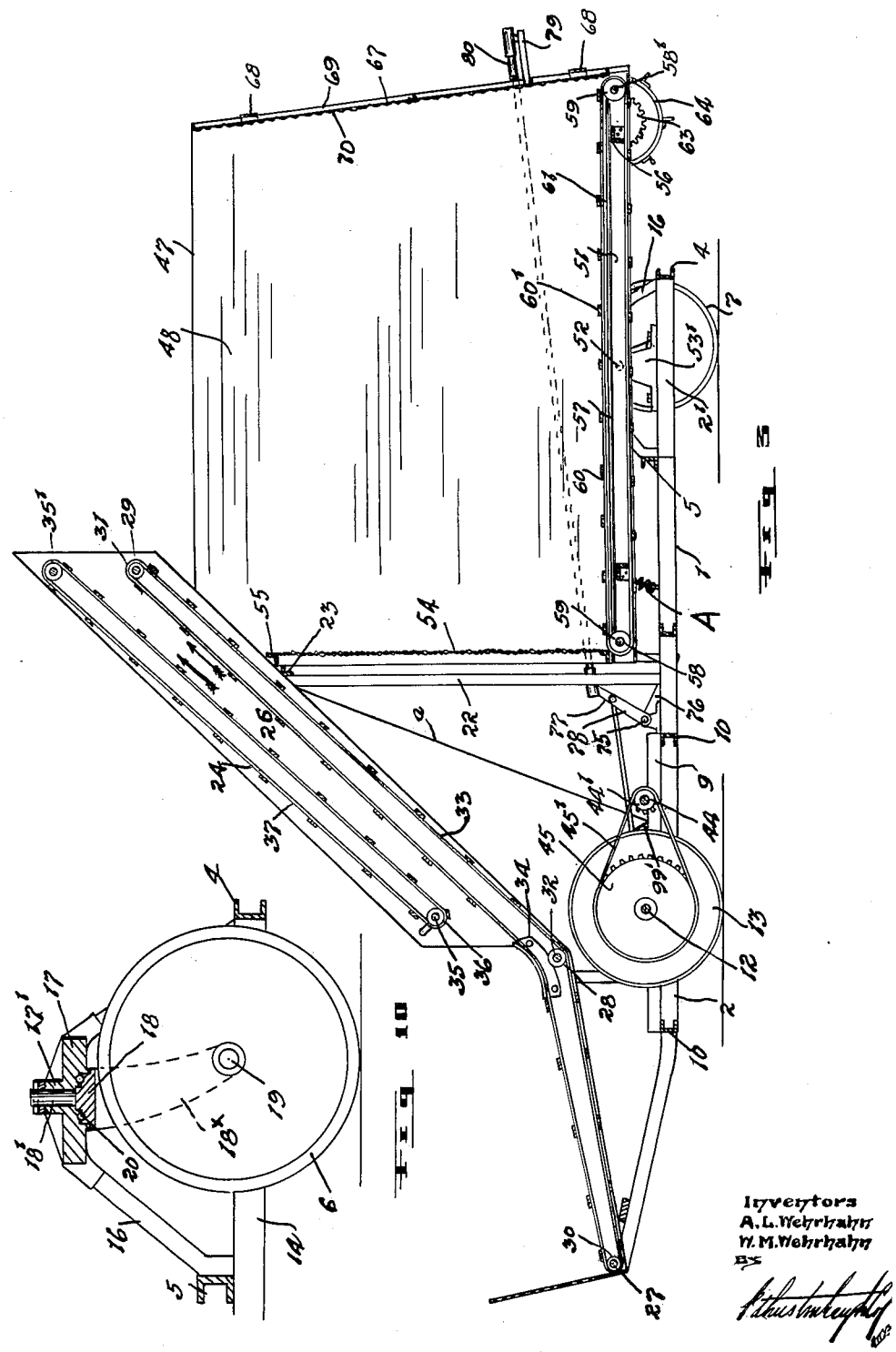

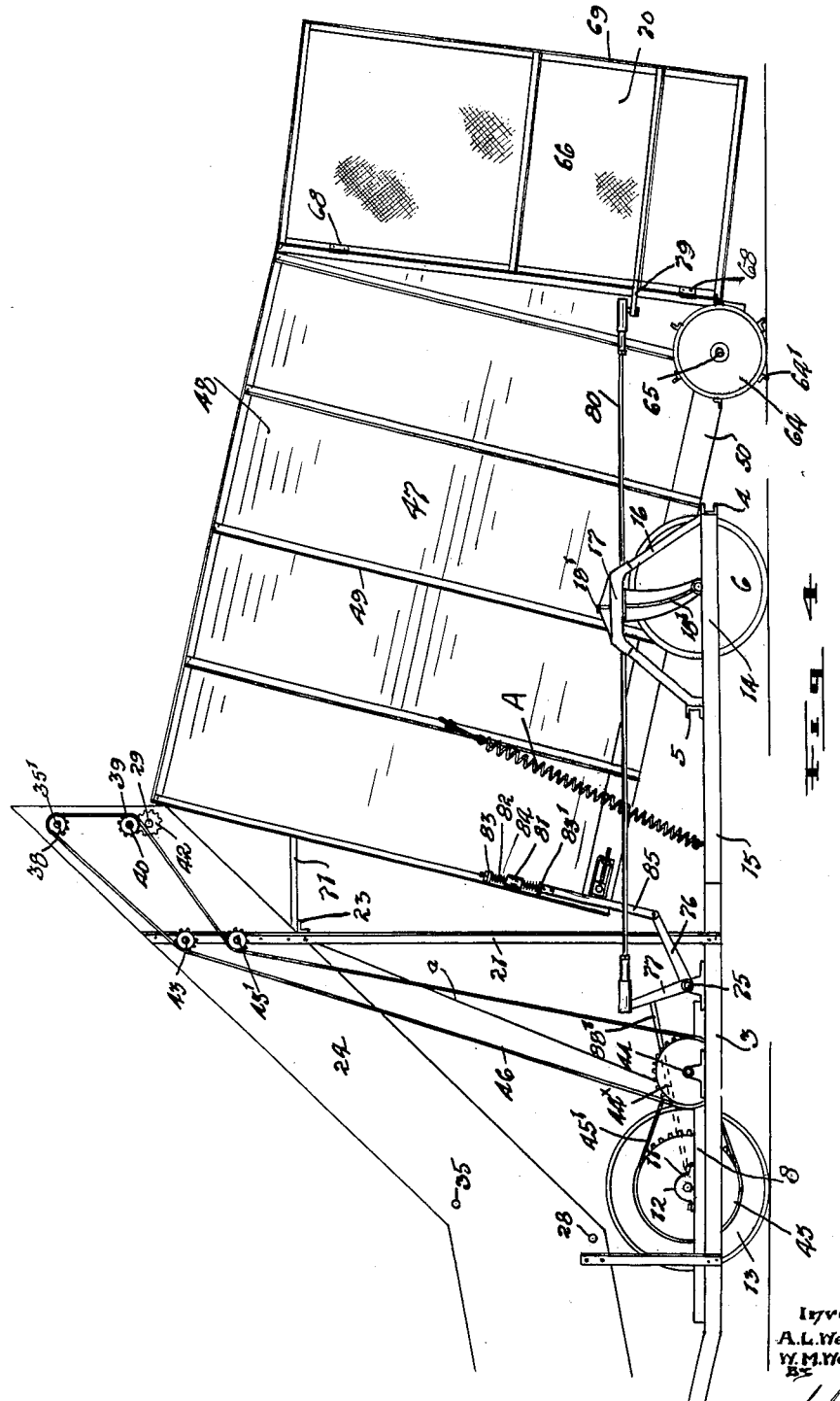

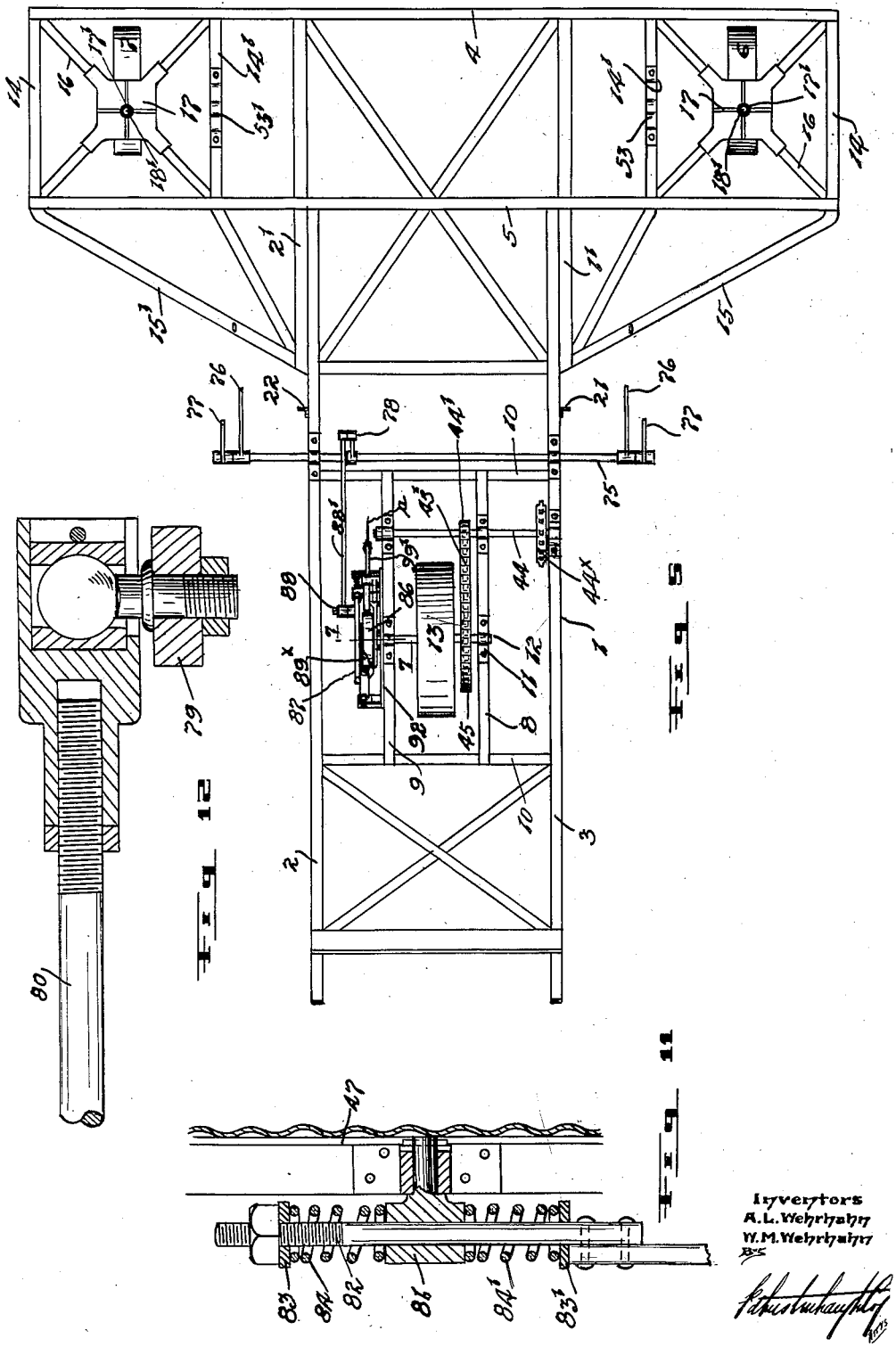

1,912,232

UNITED STATES PATENT OFFICE

AUGUST L. WEHRHAHN AND WILLIAM M. WEHRHAHN, OF ROCKHAVEN, SASKATCHEWAN, CANADA

STACKING MACHINE

Application filed February 16, 1931. Serial No. 515,959.

The invention relates to improvements in stacking machines and an object of the invention is to provide a machine for operating on the field in conjunction with the well known swather and which will receive the cut grain from the swather, elevate the same and discharge it into a rack forming part of the stacking machine and arranged such that the attendant can dump the rack to discharge the load on the field in the form of a stack, the rack subsequently returning to loading position.

A further object is to provide an elevator of a novel construction for delivering the cut grain to the rack, said elevator having its forward end slightly inclined and opened at one side to provide a receiving compartment for the grain discharged from the swather and the rear end thereof sharply inclined and provided with two spaced conveyors between which the grain is elevated, such insuring of the effective delivering of the grain and also preventing wind from blowing grain about.

A still further object of the invention is to provide a rearwardly tiltable rack of relatively large capacity for receiving the grain discharging from the upper end of the elevator, the rack being directly under the control of the operator in its dumping and return movement and positively driven in both its movements by a driving mechanism provided and actuated by one of the ground wheels of the machine.

A further object of the invention is to provide the rack with gates closing the rear end thereof in the loading position and controlled automatically so that they open as the rack starts to dump and close as the rack starts to return to load receiving position.

A still further object of the invention is to provide a load receiving rack having an endless conveyor in the bottom thereof and means for actuating the conveyor at a selected time to discharge the load built thereon.

A further object is to provide a stacking machine with a rearwardly tiltable load receiving rack having the bottom closed by an endless conveyor on which the load is built and ground wheels located rearwardly of the rack and engageable with the ground in the dumping of the rack and mechanically connected with the conveyor to drive the same rearwardly when the ground wheels aforesaid engage the ground, the speed of operation of the conveyor being approximately the same as that at which the machine advances.

A still further object of the invention is to construct the gates from skeleton frames enclosed by screens, this permitting circulation of air when the gates are closed while retaining the load and also doing away with the major part of wind pressure on the gates when the same are opened.

A further object is to construct the machine as a whole so that there will be practically no loss of grain as it is handled by the machine.

A further object of the invention is to arrange the rack construction so that after dumping, the ground wheels operating the rack conveyor will be free to ride the varying ground surface.

A still further object of the invention is to provide a centrally disposed traction wheel for supporting the front end of the machine frame and utilized for driving purposes and a pair of well spread rearwardly disposed castor wheels for supporting the rear end of the frame, the general arrangement of the wheels effectively supporting the load and also permitting of the easy manipulation of the machine on the field.

With the above more important and other minor objects in view which will become more apparent as the description proceeds, the invention consists essentially in the arrangement and construction of parts hereinafter more particularly described, reference being had to the accompanying drawings, in which:—

Fig. 1 is a side view of the machine in the load receiving position.

Fig. 2 is a plan view.

Fig. 3 is a vertical sectional view at 3—3 Figure 2.

Fig. 4 is a side view of the rear end of the machine and showing the rack in dumped position.

Fig. 5 is a plan view of the frame and various parts carried thereby, the rack and elevator being removed.

Fig. 6 is an enlarged detailed cross sectional view at 6—6 Figure 1.

Fig. 7 is an enlarged detailed vertical sectional view at 7—7 Figure 5.

Fig. 8 is a vertical sectional view at 8—8 Figure 7 and looking to the right.

Fig. 9 is a vertical sectional view at 8—8 Figure 7 and looking to the left.

Fig. 10 is a vertical sectional view at 10—10 Figure 2.

Fig. 11 is an enlarged vertical sectional view at 11—11 Figure 1.

Fig. 12 is an enlarged detailed vertical sectional view at 12—12 Figure 2.

Fig 13 is an enlarged detailed vertical sectional view at 13—13 Figure 2.

In the drawings like characters of reference indicate corresponding parts in the several figures.

The main frame 1 of the machine is substantially rectangular and embodies a pair of spaced parallel side beams 2 and 3 which are interconnected at intervals by suitable cross beams and have their forward ends up turned as shown and their rear ends provided with extension beams 2' and 3' which latter beams are connected by a relatively long rear cross beam 4. A further cross beam 5 is secured to the side beams somewhat in advance of and parallel to the beam 4 and these rear cross beams are utilized to support in a manner later described, the rear end of the frame from castor wheels 6 and 7 later described in detail.

Somewhat in advance of the centre of the frame, we provide a pair of spaced parallel relatively short beams 8 and 9 which are secured to selected cross beams 10 connecting the side beams 2 and 3 and said beams 8 and 9 are provided with similar bearings 11 which support rotatably the front axle 12 of the machine which axle is provided between the beams with a wide rimmed bull or ground wheel 13 fixed to the shaft.

The extending ends of the beams 4 and 5 are joined at each side of the frame by cross beams 14 and 14' and brace bars 15 and 15' extend angularly between the extending ends of the beam 5 and the sides of the main frame. The ends of the beams 4 and 5 support in each instance four similar upwardly converging legs 16 which have their upper ends carrying a horizontally disposed bearing plate 17 which is provided centrally with a vertical bearing sleeve 17'.

A spindle 18' is rotatably mounted in the bearing sleeve and extends upwardly from a head 18 which carries a pair of similar forks 18ˣ. The lower end of the forks receive a short shaft 19 on which the castor wheel previously mentioned is mounted and here it will be observed that the castor wheel has a comparatively wide rim. Ball bearings 20 are interposed between the head 18 and the bearing plate in each instance so that the castor wheels can swivel freely and here it will be observed that the frame bars and the legs are clear at all times of the castor wheel.

From the above, it will be obvious that the frame of the machine is supported by the forwardly located and centrally positioned bull wheel and by the two rearwardly disposed castor wheels located well to the sides of the frame. Accordingly the machine can be easily and quickly turned on the field.

In a location more or less centrally of the frame, we erect two opposing upstanding posts 21 and 22 which are connected adjoining their upper ends by a cross bar 23. These posts and the cross bar support the rear end of the elevator indicated generally by the reference numeral 24 which elevator has the forward end thereof supported by the forward up turned ends of the beams 2 and 3.

The elevator embodies opposing upstanding side shields 25 and 26 and the rear part of the elevator inclines at an angle of approximately 45° while the forepart thereof is inclined at a slight angle to the horizontal as shown and forms a receiving compartment for the cut grain delivered thereto by an accompanying machine known as a swather. The shield 26 is considerably shorter than that 25 so that the side of the elevator at the front end next the swather is open, thereby permitting the grain discharging from the swather to pass freely to the elevator.

The sides of the elevator carry cross shafts 27, 28 and 29 on which we mount end rollers 30 and 31 and an intermediate roller 32 and these rollers carry the main slatted canvas or conveyor 33 of the elevator which passes around the rollers 30 and 31 and has the under side thereof passing under the roller 32. Immediately adjoining the roller 32, the sides of the elevator are provided with similar guide flanges 34 overlying the edges of the top side of the canvas. The sides of the elevator are provided with a further pair of cross shafts 35 and 35' carrying rollers 36 on which rollers, we mount an upper slatted endless apron or conveyor 37 parallel to but spaced from the rear up going end of the former canvas.

We have not considered it necessary to give a detailed description of the canvases or conveyors as they are well known and any suitable type of canvas or conveyor can be employed to serve our purpose.

The shaft 35' is provided at one end with a chain wheel 38 and the side of the elevator is fitted with a stub shaft 39 which carries a chain wheel 40 and a gear 41 and the gear 41 meshes continuously with a gear wheel 42 secured to the shaft 29. The side of the elevator also carries two idler chain wheels 43 and 43' co-planar with the chain wheels 38 and 40.

On the main frame rearwardly of and parallel to the shaft 12, we locate a rotatably mounted counter shaft 44 which shaft is provided with two chain wheels 44' and 44ˣ, the chain wheel 44' being driven by an endless chain 45' from a driving chain wheel 45 secured to the shaft 12. An endless chain 46 passes around the chain wheel 44ˣ over the idlers 43 and 43', over the chain wheel 38 and under the chain wheel 40 and accordingly when the machine is advancing over the field, the aprons or conveyors of the elevator are driven in the direction of the applied arrows, that is, the aprons 33 and 37 have their adjacent sides travelling upwardly.

Rearwardly of the machine, we locate a pivoted rack indicated generally by the reference numeral 47 which rack has the rear end and top open, the front end and sides closed and the bottom provided with a rearwardly discharging endless conveyor and here it will be noted that the forward end of the rack underlies the rear discharging end of the elevator and that the rear end of the rack overhangs the rear end of the main frame. The details of the rack will now be described.

The upstanding sides of the rack are formed from sheet metal plates 48 riveted to suitable side bars 49 and the said sides are carried by the parallel bottom beams 50 and 51 herein shown as relatively heavy channel irons. The beams are pivotally supported at 52 from upstanding bearing brackets 53 and 53' permanently secured centrally to the beams 14' hereinbefore mentioned and here it will be observed that the pivot point on which the rack turns is somewhat in advance of the rack centre and that the beams 50 and 51 are sufficiently elevated so that when the rack dumps rearwardly, the said beams will not strike the rear cross beam 4. The rear ends of the rack sides are inclined as shown and carry gates later described and the front end of the rack is closed in any suitable manner and in this regard, we might say that we have found an open mesh screen 54 quite desirable as it allows of the free circulation of air. The screen will be carried by the sides of the rack and by a cross bar 55 extending between the sides of the rack at the front.

The side beams 50 and 51 are connected by suitably spaced cross beams 56 and these cross beams support a corrugated sheet metal bottom 57, the corrugations running from front to rear of the rack. The side beams are provided with suitable bearings which support rotatably front and rear cross shafts 58 and 58' and each of these shafts is provided with a pair of chain wheels 59 which rise above the ends of the corrugated bottom plate. Endless side chains 60 connect the pairs of chain wheels and the side chains are connected by cross slats 60'. Side and central longitudinally extending spacing bars 61 are secured permanently to the corrugated bottom 57 of the rack and these support the slats as the conveyor operates and holds the slats well clear of the bottom 57 so that the conveyor gets an effective grip on the bottom of the load built in the rack.

The rear cross shaft 58' of the rack is provided at its ends with similar pinions 62 and these pinions mesh continuously with gear wheels 63 associated with driving wheels 64 rotatably mounted on rear stub shafts 65 carried by the rear end of the rack and the arrangement is such that when the rack is dumped rearwardly, the wheels 64 will contact with the ground and will thereafter accordingly drive the rack conveyor in a direction such that the load is discharged through the rear end of the rack.

By so utilizing the driving wheels, it will be obvious that the rack conveyor will start to operate automatically when the rack is dumped and will automatically cease to operate when the rack is returned to its original load receiving position. Provision can be made whereby either of the wheels 64 may drive the conveyor while the other is idle such as when making a turn but as such an arrangement is well known in various types of machines, we have not considered it necessary to herein show and describe the same.

It will be particularly noted that ample clearance is provided so that the wheels 64 will always strike the ground under normal land conditions. The latter wheels are provided with grouts 64' to insure of effective traction.

The rear end of the rack is normally closed by a pair of similar gates 66 and 67 having the sides thereof pivotally attached by hinges 68 to the inclined ends of the rack sides and when the rack is in load receiving position, the gates have a natural tendency to gravitate inwardly due to their inclined position. The gates are each made from a skeleton frame structure 69 closed by an open meshed wire screen 70.

This makes them relatively light to manipulate, permits of air circulation when they are closed and allows the wind to blow freely through them when open.

The dumping and the return of the rack and the opening and closing of the gates is controlled by an operator accompanying the machine, the operator taking a position on an elevated side platform 71, the forward end of which is supported by the cross bar 23 and the rear end by legs 72 extending upwardly from the main frame and provided with spaced rungs 73 forming a ladder by which the operator can reach the platform. A suitable guard rail 74 encloses the outer side and front end of the platform, the inner side being kept clear so that the operator can step into the rack if needs be.

The means utilized for controlling the dumping movement of the rack and the operation of the gates is now described in detail.

Directly to the rear of the counter shaft 44, we mount in suitable bearings carried by the main frame 1, a control shaft 75 and this is provided at its ends with two cranks 76 and 77 and within the frame with a further crank 78. The cranks 76 are utilized to operate the rack and the cranks 77 to operate the gates. Each gate is provided with an outstanding arm 79 permanently secured thereto at the hinged side and the outer end of the arm is connected by an operating rod 80 to one of the cranks 77, the point of attachment of the link to the arm and to the crank in each instance being by means of a ball and socket joint to insure of the free and easy movement of the parts, it being understood that as the cranks 77 swing ahead, the gates open and on the return movement, the gates close. The cranks 76 are operatively connected to the front end of the rack.

To the lower front corners of the rack, we pivotally connect sleeves 81, each sleeve slidably receiving a shaft 82 having collars 83 and 83' secured thereto. Coiled springs 84 and 84' are interposed between the ends of the sleeves and the collars and to the lower end of each shaft, we permanently connect an operating link 85 which is pivotally connected to the adjoining crank 76 and the arrangement is such that when the cranks 76 swing upwardly, the rack is dumped rearwardly and when they swing in the reverse direction, the rack is returned to its original load receiving position. The springs 84 and 84' accommodate ground irregularities and permit the rear end of the dumped rack to rise and fall as the wheels 64 ride over the ground.

The shaft 12 is utilized to actuate the crank 78, a clutch mechanism shortly described being provided to actuate the said crank, the clutch mechanism being controlled by the operator on the platform who pulls a line to cause the clutch mechanism to go into engagement and dump the rack and open the gates and again pulls the same line to actuate the clutch mechanism to return the rack and close the gates, it being understood that the clutch mechanism is automatically disengaged when the rack has reached dumping position and when it has returned to its load receiving position.

To the shaft 12, we permanently fasten a drum 86, the flange 86' of which is provided on the interior side with a plurality of roller receiving pockets 86$^x$. On the latter shaft, we also mount rotatably a disc 87 which has the hub 87' thereof entering the drum. The disc carries a crank pin 88 which is connected by an operating link 88' pivotally to the crank 78.

The disc carries further on its inner side, a pivot pin 89' on which we mount pivotally an arcuate lever 89 which is contained within the flange of the drum and has an extending arm 89$^x$ passing between the flange of the drum and the disc and terminating in a head 90. The inner end of the lever 89 is forked and carries a roller 90' located opposite the pockets 86$^x$, it being here explained that when the lever is released, the roller is adapted to enter one or other of the pockets under the influence of a coiled spring 91 secured to the end of the lever remote from the roller and to the disc.

Assuming that the drum is rotating with the shaft and that the roller be freed to engage with the drum, it will be obvious that the disc will rotate with the shaft and the crank 78 will be operated. We desire the disc to rotate a half a revolution with the drum and then be disengaged automatically and to remain disengaged until the operator desires the reverse movement of the crank 78 at which time, he pulls the line previously mentioned and the disc again rotates with the drum for a further half revolution and is then again automatically released. The means employed for accomplishing the above result is now described.

The frame of the machine carries a stationary plate 92 which is provided with three pivot pins 93, 94 and 95, the pins 93 and 95 being at diametrically opposite sides of the shaft 12 while the pin 94 underlies the pin 95. The pins 93 and 95 pivotally support similar dogs 96 and 97 contained in the plane of the head 90 and held normally against stops 98 carried by the plate 92 by pressure springs 98' associated with the dogs.

The heads 96' and 97' of the dogs are diametrically opposing at opposite sides of the shaft 12 and when they are engaged with the stops, are in the path of travel of the head 90 of the lever 89 with which they are designed to engage. When the heads of the dogs and of the lever are engaged, the roller is disengaged from the flange of the drum and when free of the dogs, the roller is engaged with the drum and causes the rotation of the disc with the drum.

The dog 97 is formed integral with cranks 99 and 99' and the crank 99 is connected by an operating rod 99$^x$ to the head of the dog 96 so that when the lever 99' is actuated in a clockwise direction, the dogs are simultaneously moved outwardly from the stops to a position clear of the path of travel of the head 90. A suitably guided pulling line *a* is connected to the free end of the lever 99' and terminates at the operator's platform. The pivot pin 94 pivotally supports a further dog *b* similar to those just described which has the head *b'* thereof riding the periphery of the disc and pressed continuously into contact therewith by a pressure spring *c*. The disc is provided at diametrically opposite points with stop lugs *d* and *e* presenting abrupt right-angled shoulders engageable with the head *b'* of the dog *b*.

Assuming that the various parts of the clutch and the several cranks associated with the shaft 75 are positioned as shown in the principal views of the drawings, it will be apparent that as the machine is progressing over the field and the rack is receiving its load, the rack and gates will remain inert in load receiving position as at such time, the roller 90' is held clear of the pockets of the drum by the head 90 being engaged by the head 96' of the dog 96 and accordingly, the drum will rotate with the shaft 12 and free of the disc.

When the operator decides to dump the load, he will pull on the line which operates to clear the head of the dog 96 from the head 90 of the lever 89 and as soon as this occurs, the roller engages with one of the pockets of the drum and accordingly causes the disc to rotate with the drum. After the head 90 has cleared the dog 96, the pulling line will be released and the dogs 96 and 97 will return to their inner positions against the stops under the influence of the springs associated with such dogs.

Subsequently as the disc continues to rotate with the drum, the head 90 of the lever 89 in a half a revolution will strike the head 97' of the dog 97 and this will serve to disengage the roller from the drum and stop the disc from rotating further and the half revolution of the disc so occasioned is sufficient with a proper setting of the cranks to dump the rack rearwardly the required amount and fully open the gates. As soon as the rack has been dumped, the conveyor is actuated in a proper direction and by the wheels 64 to discharge the load and the rack will remain in its dumped position with the gates open until the operator decides to return the rack to its initial position.

At this time, he will again pull the line *a* and this will release the head 97' of the dog 97 from the head 90 of the lever 89 and will allow the roller to again engage the drum at which time, the drum and disc will rotate for a further half revolution and return the rack and the gates to their initial position, the return movement being automatically stopped when the head 90 returns into engagement with the head 96' of the dog 96. The dog *b* which constantly rides the face of the disc is engaged each half revolution with the right angled shoulders of the lugs *d* and *e* and serves to prevent counter clockwise movement of the disc at such time.

While we have entered into a detailed description of the particular type of clutch employed, we, of course, wish it to be distinctly understood that any clutch mechanism which will operate in the manner disclosed, will serve our purpose.

We have not considered it necessary to show or describe in detail the swather with which this machine is used. It is to be understood, however, that our machine will be suitably hitched to the swather and will move over the field with the same and that the swather will deliver cut grain into the forward end of the elevator 24. The grain delivered onto the elevator from the swather will be passed upwardly between the elevator canvases and discharged into the rack. As the operator on the platform is close to the rack, he can aid in distributing the load if necessary and is in an advantageous position to watch the complete operation of the machine. When he considers that a sufficient load is built in the rack, he pulls the line *a* to cause the rack to dump rearwardly and the load to be discharged and after the load has been deposited, he again pulls the line and the rack and parts associated therewith return to their initial load receiving position.

We might here mention that the discharge of the load by the rack conveyor is such that the top side of the conveyor will travel rearwardly approximately at the same speed as the machine is advancing so that the load will be effectively delivered on the field.

In order to steady the rack when the machine is operating on the field, we have provided similar tension springs A connecting the front end of the rack to the frame which springs also prevent the jolting of the clutch connections due to the fact that the pivot point of the rack is in advance of the centre of gravity thereof.

What we claim as our invention is:—

1. In a stacking machine, the combination with a portable frame, of a rearwardly dumpable load receiving rack pivotally mounted on the rear end of the frame, a rearwardly discharging conveyor in the bottom of the rack and driving means carried by the rear end of the rack and engageable with the ground in the dumping of the rack and operatively connected with the conveyor to drive the same upon said means being engaged with the ground.

2. A stacking machine having a rearwardly dumpable load receiving rack, a rearwardly discharging conveyor closing the bottom of the rack and conveyor driving means carried by the rear end of the rack and adapted in the dumping of the rack to engage the ground and drive the conveyor as the machine advances.

3. In a stacking machine, a pivoted rearwardly dumpable load receiving rack, an endless conveyor closing the bottom of the rack, wheels mounted on the rear end of the rack and driving connections between the wheels and the conveyor, said wheels being adapted to engage the ground upon the rack being dumped and drive the conveyor in a direction to discharge the load as the machine advances.

4. In a stacking machine, a portable main frame, a load receiving rack pivotally mounted on the rear end of the machine and rearwardly dumpable, a normally inert endless conveyor closing the bottom of the rack, normally closed pivoted gates closing the rear end of the rack, clutch controlled power driven means for dumping and returning the rack, means for automatically opening the gates as the rack dumps and for automatically closing the same as the rack returns to its original position and wheels carried by the rear end of the rack and engageable with the ground as the rack dumps, said wheels being operatively connected with the conveyor to drive the same upon the wheels engaging the ground and as the machine advances and in a direction such that the conveyor discharges the load.

5. In a stacking machine, the combination with a portable frame, of a pivoted rearwardly dumpable load receiving rack mounted on the rear end of the frame, an endless conveyor closing the bottom of the rack, power driven manually controlled means for dumping the rack and returning the same to its load receiving position and means carried by the rear end of the rack and engageable with the ground in the dumping thereof, said means operating by engagement with the ground and in the forward movement of the machine to drive the conveyor in a direction to discharge the load.

6. In a stacking machine, the combination with a wheeled frame, of a load receiving rack pivotally mounted on the rear end of the frame and rearwardly dumpable, an endless conveyor closing the bottom of the rack, an operating shaft mounted on the frame, a drive shaft driven by one of the wheels aforesaid, a manually actuated clutch controlled driving connection between the drive shaft and the operating shaft, operating means between the operating shaft and the rack for dumping and returning the rack and normally elevated wheels mounted on the rear end of the rack and engageable with the ground in the dumping of the rack, said wheels being operatively connected to the conveyor to drive the same and discharge the load as the machine advances.

7. In a stacking machine, the combination with a wheeled frame, of a load receiving rack pivotally mounted on the rear end of the frame and rearwardly dumpable, an endless conveyor closing the bottom of the rack, pivoted gates normally closing the rear end of the rack, power driven manually controlled means for dumping the rack and returning the same to its normal position and for opening the gates as the rack dumps and for closing the same as the rack returns to its normal position, wheels rotatably carried by the rear end of the rack and engageable with the ground in the dumping of the rack and driving connections between the wheels and the conveyor operating to drive the conveyor in a direction to discharge the load as the machine advances.

Signed at Rockhaven, Sask. this 21st day of July, 1930.

AUGUST L. WEHRHAHN.
WILLIAM M. WEHRHAHN.